United States Patent [19]  [11] 3,912,587
Enei et al.  [45] Oct. 14, 1975

[54] METHOD OF PRODUCING GUANOSINE BY FERMENTATION

[75] Inventors: Hitoshi Enei, Zushi; Yasuo Anzai; Katsuaki Sato, both of Kawasaki; Hajime Eguchi, Yokohama; Yoshio Hirose, Fujisawa, all of Japan

[73] Assignee: Ajinomoto Co., Inc., Tokyo, Japan

[22] Filed: June 10, 1974

[21] Appl. No.: 478,157

[30] Foreign Application Priority Data
June 14, 1973 Japan.................................. 48-67276

[52] U.S. Cl................................................. 195/28 N
[51] Int. Cl.²......................................... C12D 13/06
[58] Field of Search.................................. 195/28 N

[56] References Cited
UNITED STATES PATENTS
3,575,809  4/1971  Shiro et al. ........................ 195/28 N Primary Examiner—Alvin E. Tanenholtz
Attorney, Agent, or Firm—Cooper, Dunham, Clark, Griffin & Moran

[57] ABSTRACT

A method for producing guanosine by aerobic culture of a microorganism of the genus Bacillus which requires adenine for growth and is resistant to at least one of methionine, methionine-analogues and azaserine.

4 Claims, No Drawings

METHOD OF PRODUCING GUANOSINE BY FERMENTATION

This invention relates to a method of producing guanosine by fermentation.

Guanosine has a great use for producing sodium salt of guanosine 5'-monophosphate which is useful as a seasoning agent. It is known that a mutant of Bacillus subtilis resistant to 8-azaguanine and requiring adenine for growth produces guanosine in the culture medium in which it grows (J. Gen. Appl. Microbiol., 15, 399-411 (1969)).

It has now been found that remarkably higher amounts of guanosine is produced, when it is compared with the known method, by culturing in a culture medium a mutant of Bacillus which is resistant to at least one compound selected from methionine, methionine-analogue, and azaserine, and which requires adenine for growth.

The mutants are derived from the parent strains by mutagenic doses of ionizing radiation (ultra-violet lights, X-rays, gamma-rays) or of chemical agents (sodium nitrate, N-methyl-N'-nitro-N-nitrosoguanidine, diethyl sulfate), and by screening the treated parent strains for mutants having the desired properties. Adenine-requiring mutants are isolated by the replication method, and mutants resistant to methionine, methionine analogues, or azaserine are identified by their ability of growing vigorously on otherwise conventional media containing enough of the compounds to be resisted to suppress growth of the parent strains.

Resistance is determined by comparing the relative growth of the mutant in the presence of the compounds with that of parent strain, relative growth being the ratio of growth on a medium containing the compounds to growth on a medium free from the compounds.

Methionine analogues are chemically analogous to metionine, and they inhibit the growth of many microorganisms, and this inhibition can be overcome at least in part by methionine. Commonly known methionine analogues are methylmethionine sulfonium chloride, methionine sulfoxide, and ethionine.

It has been found that mutants which resist one methionine analogue also resist usually other methionine analogue.

Mutant which is resistant further to 8-azaguanine usually produce more increased amount of guanosine. Mutant resistant to 8-azaguanine is resistant also to other purine analogues such as 8-azaxanthine, 8-azaadenine, thioninosine, 6-mercaptopurine, 6-chloropurine, 6-aminopurine, 2-amino-6-mercaptopurine, 4-hydroxythiazolepyrimidine, 6-mercapto-8-hydroxypurine, and 6-methyl-4-nitro-5-imidazole thiopurine.

The most effective guanosine producing mutants found so far (and the compounds employed in screening them, and then to which the mutant resist) are as follows:

Bacillus subtilis AJ 3473 (FERM-P 2107) (methyl-methioninesulfonium chloride)
Bacillus subtilis AJ 3474 (FERM-P 2108) (azaserine)
Bacillus subtilis AJ 3475 (FERM-P 2109) (methioninesulfoxide)
Bacillus subtilis AJ 3476 (FERM-P 2110) (ethionine)
Bacillus subtilis AJ 3477 (FERM-P 2111) (methionine)
Bacillus subtilis AJ 3478 (FERM-P 2112) (8-azaguanine, methioninesulfoxide)
Bacillus subtilis AJ 3479 (FERM-P 2113) (8-azaguanine, azaserine)
Bacillus subtilis AJ 3480 (FERM-P 2114) (methionine + methioninesulfoxide)
Bacillus subtilis AJ 3481 (FERM-P 2115) (8-azaguanine, methionine + methioninesulfoxide)
Bacillus pumilus AJ 3482 (FERM-P 2116) (methioninesulfoxide)

"+" shows that mutant was screened in the medium containing both methionine and methioninesulfoxide.

The culture media in which the mutants of the invention produce guanosine are largely conventional. They must contain sources of assimilable carbon and nitrogen and adenine, and should further contain inorganic ions and minor organic nutrients. Suitable carbon source may be glucose, fructose, sucrose, starch hydrolyzate and molasses. Nitrogen may be derived from nitrates, ammonium salts, ammonium hydroxide, urea, and like inorganic and organic compounds.

Aerobic conditions are maintained by aeration and/or agitation, and pH is held between 5 and 9 for good yields. When ammonia is used for pH control, it may also serve as a nitrogen source. The guanosine concentration in the broth reaches its maximum within 2 to 7 days if the fermentation is carried out at 24°C to 37°C.

The guanosine accumulated in the fermentation broth can be recovered by conventional methods, such as removing cells by filtration or centrifuging, passing the broth over an ion exchange resin.

Microorganisms identified by FERM-P numbers are available from the Fermentation Research Institute of the Agency of Industrial Science & Technology, Chiba-shi, Chiba-ken, Japan.

The following Examples further illustrate the invention.

EXAMPLE 1

Resistance of each mutant to the compounds listed in Tables was tested as follows:

An aqueous medium was prepared to contain, per deciliter, 0.02 g $MgSOhd 4.7H_2O$, 0.05 g sodium citrate, 0.1 g L-glutamic acid, 2.5 g glucose, 0.5 g $NH_4Cl$, 0.4 g $KH_2PO_4$, 1 mg $FeSO_4.7H_2O$, 1 mg $MnSO_4.4H_2O$, 100 $\mu$g vitamin $B_1$, 10 mg adenine and 0.2 g caseinhydrolyzate (pH 7.0). The aqueous medium was further added with each of compounds listed in Tables 1 to 7, and placed (total volume 3 ml) in test tubes. Each tube was inoculated after sterilization with 0.05 ml of cell suspension containing $10^6$ cells/ml, and shaken at 34°C for 24 hours. Growth was determined by measuring turbidity of culture broth. Results are shown in Tables 1 to 7.

EXAMPLE 2

Each microorganism listed in Table 10 was cultured with shaking at 34°C for 16 hours in an aqueous culture medium containing 2 g/dl glucose, 0.5 g/dl yeast extract, 0.1 g/dl NaCl, 20 mg/dl adenine, 4 ml/dl soyprotein-acid hydrolyzate ("MIEKI"), 0.02 g/dl $KH_2PO_4$ and 0.04 g/dl $MgSO_4.7H_2O$.

An aqueous fermentation medium was prepared to contain, per deciliter, 8 g glucose, 1.5 g $NH_4NO_3$, 0.02 g $KH_2PO_4$, 0.04 g $MgSO_4.7H_2O$, 0.2 mg ferrous ion, 0.2 mg manganese ion, 0.2 g $CaCl_2.2H_2O$, 0.1 g RNA (separated from yeast), 4 ml soyprotein-acid hydrolyzate and 3 g $CaCO_3$ (separately sterilized), adjusted at pH 7.0 and sterilized with steam.

20 ml Batches of the fermentation medium in 500 ml flasks were inoculated each with 1 ml of the previously prepared seed cultures.

The fermentation was carried out at 34°C with shaking for 72 hours. The amounts of guanosine in the fermentation broths was determined by paperchromatography, and the results are shown in Table 10.

1.5 Liter of the fermentation broth of AJ 3481 were prepared by the analogous manner as above. Cells were separated from the broth by filtration, and thereafter guanosine was isolated with an anion exchange resin. 12.5 G of crude guanosine crystalline were precipitated by adding acetone to the eluate.

Table 1

| 8-Aza-guanine γ/cc | Relative Growth | | | | |
|---|---|---|---|---|---|
| | AJ 3483 | AJ 3481 | AJ 3618 | AJ 3478 | AJ 3479 |
| 0 | 100 | 100 | 100 | 100 | 100 |
| 50 | 50 | 92 | 100 | 90 | 88 |
| 100 | 18 | 85 | 92 | 85 | 60 |
| 300 | 2 | 50 | 40 | 50 | 32 |
| 500 | 0 | 20 | 15 | 22 | 12 |
| 1000 | 0 | 8 | 0 | 10 | 2 |
| 2000 | 0 | 0 | 0 | 0 | 0 |

Table 2

| Azaserine γ/cc | Relative Growth | | |
|---|---|---|---|
| | AJ 3483 | AJ 3474 | AJ 3479 |
| 0 | 100 | 100 | 100 |
| 50 | 18 | 86 | 92 |
| 100 | 0 | 55 | 68 |
| 300 | 0 | 15 | 35 |
| 500 | 0 | 0 | 8 |
| 1000 | 0 | 0 | 0 |

Table 3

| Methyl methionine sulfonium chloride γ/cc | Relative Growth | |
|---|---|---|
| | AJ 3483 | AJ 3473 |
| 0 | 100 | 100 |
| 100 | 50 | 89 |
| 1000 | 25 | 60 |
| 5000 | 0 | 43 |
| 10000 | 0 | 15 |
| 20000 | 0 | 2 |

Table 4

| Methionine-sulfoxide γ/cc | Relative Growth | | | | |
|---|---|---|---|---|---|
| | AJ 3483 | AJ 3475 | AJ 3478 | AJ 3484 | AJ 3482 |
| 0 | 100 | 100 | 100 | 100 | 100 |
| 100 | 63 | 96 | 98 | 25 | 90 |
| 500 | 18 | 83 | 92 | 5 | 80 |
| 1000 | 0 | 70 | 82 | 0 | 65 |
| 2000 | 0 | 43 | 66 | 0 | 40 |
| 5000 | 0 | 28 | 38 | 0 | 25 |
| 10000 | 0 | 10 | 12 | 0 | 10 |
| 20000 | 0 | 8 | 3 | 0 | 2 |

Table 5

| Methionine γ/cc | Relative Growth | |
|---|---|---|
| | AJ 3483 | AJ 3477 |
| 0 | 100 | 100 |
| 500 | 100 | 110 |
| 1000 | 80 | 105 |
| 5000 | 76 | 98 |
| 10000 | 52 | 90 |
| 20000 | 35 | 60 |
| 50000 | 0 | 55 |

Table 6

| Ethionine γ/cc | Relative Growth | |
|---|---|---|
| | AJ 3483 | AJ 3476 |
| 0 | 100 | 100 |
| 100 | 26 | 85 |
| 200 | 0 | 63 |
| 500 | 0 | 30 |
| 1000 | 0 | 15 |
| 2000 | 0 | 5 |
| 5000 | 0 | 0 |
| 10000 | 0 | 0 |

Table 7

| Methionine γ/cc | Methionine sulfoxide γ/cc | Relative Growth | | |
|---|---|---|---|---|
| | | AJ 3483 | AJ 3480 | AJ 3481 |
| 30000 | 0 | 100 | 100 | 100 |
| 30000 | 100 | 15 | 95 | 98 |
| 30000 | 500 | 0 | 90 | 92 |
| 30000 | 1000 | 0 | 85 | 86 |
| 30000 | 2000 | 0 | 67 | 73 |
| 30000 | 5000 | 0 | 55 | 65 |
| 30000 | 10000 | 0 | 25 | 42 |
| 30000 | 20000 | 0 | 6 | 20 |

Table 8

| Microorganism | | Guanosine accumulated(g/l) |
|---|---|---|
| Bacillus | subtilis AJ 3473 | 4.7 |
| " | " AJ 3474 | 4.2 |
| " | " AJ 3475 | 4.6 |
| " | " AJ 3476 | 3.5 |
| " | " AJ 3477 | 3.1 |
| " | " AJ 3478 | 7.2 |
| " | " AJ 3479 | 6.6 |
| " | " AJ 3480 | 5.2 |
| " | " AJ 3481 | 8.2 |
| Bacillus | pumilus AJ 3482 | 3.2 |
| Bacillus | subtilis AJ 3483 | 1.8 |
| Bacillus | pumilus AJ 3484 | 1.0 |

Bacillus subtilis AJ 3483 and Bacillus pumilus AJ 3484 are adenine-requiring and guanosine producing mutant from which the mutants of this invention were induced.

What is claimed is:

1. A method for producing guanosine which comprises culturing a guanosine-producing mutant selected from the group of mutants derived from Bacillus subtilis and Bacillus pumilus which requires adenine for growth and which is resistant to at least one compound selected from methionine, methionine analogue and azaserine, under aerobic condition in an aqueous culture medium until guanosine accumulates in the medium, and recovering accumulated guanosine from culture medium.

2. A method as set forth in claim 1, said mutant being resistant further to 8-azaguanine.

3. A method as set forth in claim 1, said methionine analogue being methylmethioninesulfonium chloride, methioninesulfoxide or ethionine.

4. A method as set forth in claim 1, said mutant being Bacillus subtilis FERM-P 2107, Bacillus subtilis FERM-P 2108, Bacillus subtilis FERM-P 2109, Bacillus subtilis FERM-P 2110, Bacillus subtilis FERM-P 2111, Bacillus subtilis FERM-P 2112, Bacillus subtilis FERM-P 2113, Bacillus subtilis FERM-P 2114, Bacillus subtilis FERM-P 2115, or Bacillus pumilus FERM-P 2116.

* * * * *